No. 680,352. Patented Aug. 13, 1901.
J. C. PATTERSON.
BOX OPENER.
(Application filed Apr. 1, 1901.)
(No Model.)
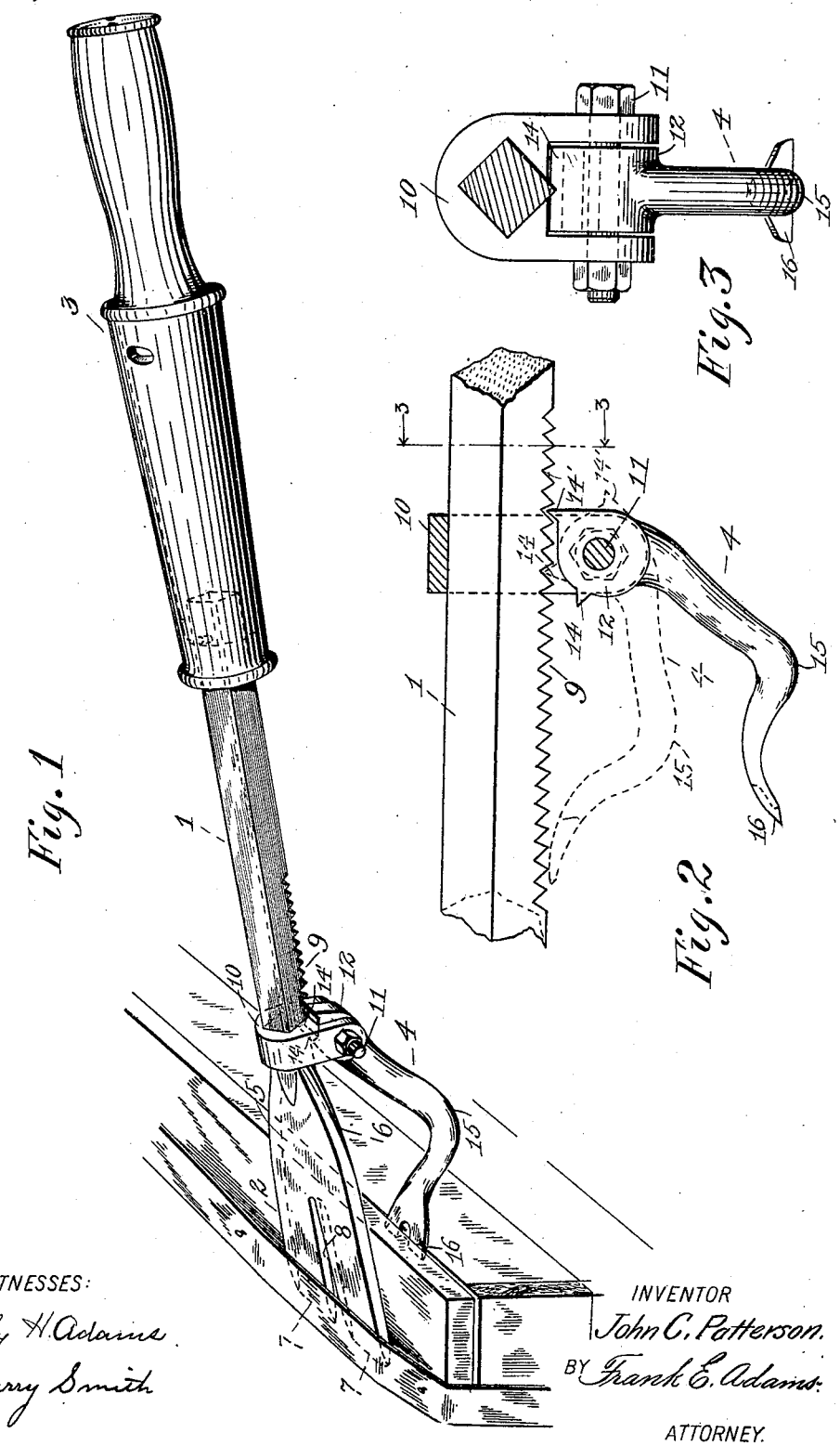
WITNESSES:
Emily H. Adams
W. Parry Smith
INVENTOR
John C. Patterson.
BY Frank E. Adams.
ATTORNEY.

UNITED STATES PATENT OFFICE.

JOHN CALHOUN PATTERSON, OF SEATTLE, WASHINGTON.

BOX-OPENER.

SPECIFICATION forming part of Letters Patent No. 680,352, dated August 13, 1901.

Application filed April 1, 1901. Serial No. 53,877. (No model.)

*To all whom it may concern:*

Be it known that I, JOHN CALHOUN PATTERSON, a citizen of the United States of America, and a resident of Seattle, in the county of King and State of Washington, have invented certain new and useful Improvements in Box-Openers, of which the following is a specification.

My invention relates to improvements in implements especially adapted to open boxes.

Among numerous objects attained by this invention and readily understood from the following specification and accompanying drawings is the production of an implement of the above-mentioned class of simple and inexpensive construction, powerful and reliable action, and adapted to work in various ways in separating structures.

With reference to the drawings heretofore mentioned, included as a part of this specification and bearing like reference characters for corresponding parts throughout, Figure 1 is a perspective view of the implement indicating primary application in opening a bound box. Fig. 2 is a side elevation, partly in section, of a portion of the shank, on a large scale, with the adjustable fulcrum-piece in place; and Fig. 3 is a transverse section on line 3 3 of Fig. 2 viewed as the arrows fly.

The implement as now embodied comprises a suitable shank, as 1, a working point or wedge, as 2, suitably fixed in prolongation of one end thereof, a ram 3, operatively engaged with the opposite end, and a fulcrum-piece 4, adjustably mounted on the shank between the wedge and ram. In the present instance the wedge 2 is preferably formed integral with the shank and is composed of metal of requisite hardness to withstand the strain and blows necessitated in separating and prying apart members of a structure—such as a box, floor, wall, or the like—and the opposite side faces 5 and 6 thereof are preferably rendered of substantial width to give a broad contact-surface in working and are conveniently made to converge outwardly at but a slight angle from the shank 1 to a line adjacent the working edge of the wedge, so as to increase the efficiency of the wedge in separating. From this line said faces are preferably converged at a more acute angle to form a chisel edge, as 7, and thereby adapt the wedge for cutting metal bindings, as straps, nails, or the like, and a suitable nail-notch, as 8, is conveniently provided in the wedge to facilitate the extraction of nails as desired.

As now considered, the ram 3 is substantially like the ordinary sliding device employed to impart a blow in nail-pullers and is likewise associated with the shank 1 and when retracted, as for impact, increases the leverage of the implement, as indicated in Fig. 1, and also forms a convenient handle for manipulating the implement at all times.

The shank 1 is preferably formed rectangular in transverse section, but not essentially so, and may be of any desired form; but as now considered it is substantially square, and the wedge-shaped extremity 2 is preferably arranged with the side surfaces diagonally disposed thereto to render the article more durable in prying and conveniently provide for a rack, as 9. As now considered, this rack comprises suitable indentures, formed transversely one of the corners of the shank, and is adapted to facilitate the adjustment of the fulcrum-piece 4 and to secure same in adjusted position during manipulation of the implement. These indentures comprise suitable notches conveniently formed in the lower corner of the shank and adapted to coöperate with suitable pawls, and thereby to simplify the locking and unlocking of the fulcrum-piece in adjusting its position, as will be understood from the following.

In the present embodiment the fulcrum-piece 4 is conveniently rendered in the form of a leg, which is preferably pivotally attached to a suitable carrier, as 10, slidably mounted on shank 1 for adjustment of the fulcrum-piece. This carrier comprises a substantially U-shaped clamp with a bore conforming to the contour of shank 1, so as to slidably embrace the same, with the ends of the stems lying beyond the rack 9 and adapted to be clamped to the shank to secure the position of the fulcrum-piece by means of a suitable bolt, as 11, placed transversely said stems in suitable apertures therein under the shank, and also adapted to form the pivotal support for the leg, which is suitably formed with a head, as 12, apertured to receive said bolt, and having suitable pawls, as 14 and 14', fixed thereto, so as to engage with the rack when the leg is placed in open or closed position to change the fulcrum-point of the shank relative to the fulcrum-piece, as indicated by bold and broken lines, respectively, in Fig. 2. As preferably embodied, fulcrum-piece 4 is formed with a suitable knee, as 15, intermediate its respective ends, upon which shank 1 is operated when desired to pry up boards from a plane, as a floor, side of box, or the like, and when so operating the fulcrum-piece is conveniently closed on the shank, as disclosed by broken lines, Fig. 2, and the pawl 14 should then engage the rack 9 to maintain relative position of the fulcrum and shank, as predetermined and fixed by suitable adjustment of the carrier 10, obtainable upon proper manipulation of the bolt 11 and by swinging the fulcrum-piece to an intermediate position to disengage both pawls from the rack. At the free end of the fulcrum-piece a suitable claw, as 16, is preferably conveniently formed to adapt the piece for biting into smooth surfaces and to enter cracks, incisions, or notches or rest upon slight projections, and thus afford a fulcrum-support for the implement, with the shank 1 swinging on the bolt 11 or claw 16 as a fulcrum, according to circumstances and readily understood.

As now considered, the fulcrum-piece 4 comprises a substantially L-shaped leg pivoted to the carrier or adjustable clamp 10 and adapted to offer a fulcrum either upon its free end, angle-point, or pivotal connection to shank 1, and thereby adapt the implement for operating in a variety of ways in ripping open boxes and tearing down structures.

In operating the implement the ram 3 is employed in the usual manner to deliver a blow upon the end of shank 1, which impact will drive the wedge and force it between the parts of a box, floor, or the like or to cut asunder bands or nails, as directed.

From the foregoing it will be understood that an implement produced as above is inexpensive of construction, durable and positive in action and not readily put out of order, and affords means for separating structures in numerous ways, whereby a box or the like can be opened rapidly and expeditiously.

Having thus described my invention, what I claim as new, and desire to secure by Letters Patent, is—

1. An implement of the nature indicated; comprising a rectangular shank formed with a diagonally-disposed wedge-shaped extremity brought to a chisel edge, a nail-notch in said edge and a ram slidably mounted for impact on the opposite end.

2. An implement of the nature indicated, comprising a shank having a working point and a handle, a rack between the handle and point, a carrier slidably mounted on said shank and a fulcrum-piece pivoted to the carrier between its stems and operative pawls on said piece adapted to engage said rack when the piece lies in open or closed position.

3. An implement of the nature indicated; comprising a shank having a working point and a handle, a carrier slidably mounted on said shank and a fulcrum-piece attached to said carrier and having a knee.

4. An implement of the nature indicated; comprising a shank having a working point and a handle, a substantially U-shaped carrier mounted on said shank, means to lock the carrier from movement and a substantially L-shaped fulcrum-piece pivoted to said carrier between the stems.

5. An implement of the nature indicated; comprising a shank having a working point and a handle, a U-shaped carrier slidably mounted on the shank, means to secure the carrier on the shank and a substantially L-shaped fulcrum-piece pivoted between the stems of the carrier by one end and having the opposite end formed as a claw.

6. An implement of the nature indicated; comprising a rectangular shank having a working point and a handle and indentures in one corner to form a rack, a carrier slidably mounted on the shank and a substantially L-shaped fulcrum-piece pivotally mounted on the carrier and having opposite pawls adjacent the pivot alternately coöperating with the rack as said piece lies opened and closed.

7. An implement of the nature indicated; comprising a rectangular shank having a working point and a handle and a rack formed of notches in one corner, a substantially U-shaped carrier slidably mounted on the shank and having a clamping-bolt beyond said rack, a substantially L-shaped fulcrum-piece pivotally engaged with said bolt by one end and having pawls on said end adapted to alternately coöperate with said rack as the lever lies opened and closed and a claw at the free end of said piece.

8. An implement of the nature indicated; comprising a shank formed with a wedge-shaped working point having a chisel edge and a nail-notch, a ram slidably mounted on said shank, a carrier slidable on the shank between said point and ram and a substantially L-shaped fulcrum-leg pivotally attached to the carrier.

9. An implement of the nature indicated; comprising a shank formed with a wedge-shaped working point having a chisel edge and nail-notch, a ram, a carrier on said shank, means to lock the carrier from movement and a substantially L-shaped fulcrum-leg pivoted to the carrier by one end and adapted to offer a fulcrum to the shank on its pivot, angle-point or free end.

10. An implement of the nature indicated comprising a shank, formed with a wedge-shaped working point, a ram, a substantially U-shaped carrier slidable on the shank, a clamping-bolt transversely the stems of the carrier and a substantially L-shaped fulcrum-leg pivoted on said bolt and formed with a claw at the free end.

11. An implement of the nature indicated; comprising a shank formed with a wedge-shaped working point, a ram, a carrier, a rack on said shank and a fulcrum-leg pivoted to the carrier and having opposite pawls adapted to alternately coöperate with said rack as the leg is opened and closed.

12. An implement of the nature indicated; comprising a shank formed with a wedge-shaped working point and a nail-notch, a ram, a substantially U-shaped carrier, a clamping-bolt transversely the stems of the carrier, a rack on said shank and a substantially L-shaped fulcrum-leg pivoted on said bolt and having pawls adapted to coöperate with said rack as the leg is opened and closed and a claw at the free end.

13. An implement of the nature indicated; comprising a rectangular shank formed with a diagonally-disposed wedge-shaped working point and a nail-notch, a ram, a substantially U-shaped carrier bored to slidably fit said shank, a clamping-bolt transversely the stems of the carrier, a succession of notches in one corner of the shank between said stems and a substantially L-shaped fulcrum-leg pivoted by one end to said bolt and having pawls adapted to alternately coöperate with said notches when the leg is opened and closed and a claw at free end.

14. An implement of the nature indicated; comprising a rectangular shank formed with a diagonally-disposed flattened working point composed of substantially broad side surfaces converging outwardly at a slight angle and then converged abruptly to form a chisel edge and a nail-notch in said edge, a ram slidably mounted on the opposite end of the shank, a series of rack indentures in the under corner of said shank, a substantially U-shaped carrier bored to slidably fit the shank, a clamping-bolt transversely the stems of the carrier and a substantially L-shaped fulcrum-leg pivoted on said bolt between the stems having pawls arranged to coöperate with the said indentures when the leg is open or closed and a claw at the free end.

Signed by me at Seattle, Washington, this 21st day of March, 1901.

JOHN CALHOUN PATTERSON.

Witnesses:
  GEO. L. HALE,
  W. J. HEMPHILL.